United States Patent [19]
White

[11] Patent Number: 6,056,245
[45] Date of Patent: May 2, 2000

[54] FLARED CABLE SUPPORT FOR TELECOMMUNICATION SYSTEM INSTALLATIONS

[75] Inventor: Phillip E. White, 9 Hickory Hill Dr., O'Fallon, Mo. 63366

[73] Assignee: Phillip E. White, O'Fallon, Mo.

[21] Appl. No.: 08/847,366

[22] Filed: Apr. 24, 1997

Related U.S. Application Data

[63] Continuation-in-part of application No. 08/591,737, Jan. 25, 1996, abandoned.

[51] Int. Cl.$^7$ .................................................. E21F 17/02
[52] U.S. Cl. ............................ 248/58; 248/49; 248/74.1; 174/135; 385/147; 385/135
[58] Field of Search ................................ 248/58, 62, 71, 248/74.1, 542, 51, 52, 74.2, 49; 174/135; 385/147, 135

[56] References Cited

U.S. PATENT DOCUMENTS

| 973,409 | 10/1910 | Crabbe | 248/71 |
|---|---|---|---|
| 1,640,744 | 8/1927 | Zapf | 174/135 |
| 1,943,136 | 1/1934 | Moser | 248/51 |
| 2,122,988 | 7/1938 | Nelson | 248/58 |
| 2,721,891 | 10/1955 | Kersten | 248/49 X |
| 2,858,106 | 10/1958 | Anton | 248/49 X |
| 2,913,791 | 11/1959 | Martin | 24/136 R |
| 3,848,839 | 11/1974 | Tillman | 248/74.2 X |
| 4,393,998 | 7/1983 | Allen et al. | 248/74.1 X |
| 4,705,243 | 11/1987 | Hartmann et al. | 248/51 |
| 5,007,605 | 4/1991 | Horvath | 248/62 |
| 5,544,849 | 8/1996 | Peterson et al. | 248/74.1 |
| 5,836,148 | 11/1998 | Fukao | 248/49 X |

FOREIGN PATENT DOCUMENTS

| 946500 | 6/1949 | France | 174/135 |
|---|---|---|---|
| 882653 | 11/1961 | United Kingdom | 248/74.1 |

*Primary Examiner*—Leslie A. Braun
*Assistant Examiner*—Gwendolyn Baxter
*Attorney, Agent, or Firm*—Polster, Lieder, Woodruff, & Lucchesi L.C.

[57] ABSTRACT

A cable support (100) for installing or retrofitting a telecommunications system cable (C). The cable support comprises an elongate hollow tube formed of two identical pieces (102A, 102B) which are fitted together by hand. The inner diameter of the tube is greater than the outer diameter of the cable so the cable fits through the tube. Each cable support piece has an outwardly flaring end section which has a radius of curvature corresponding to a defined radius of curvature for bending the cable from a vertical-to-horizontal direction, or vice versa. Each piece also includes a helical cable channel (104A, 104B) extending from an outer to an inner end of the piece. When assembled, the inner ends of the cable channel are coterminous so a cable channel extending throughout the length of the completed support is formed. This allows a length of cable to be readily inserted into the support. The inner ends of the pieces fit together by a friction fit to complete the support. A bridle ring (1) holds the cable support in place. Use of the cable support prevents droop and degration in cable performance in the transfer of information through the cable.

3 Claims, 4 Drawing Sheets

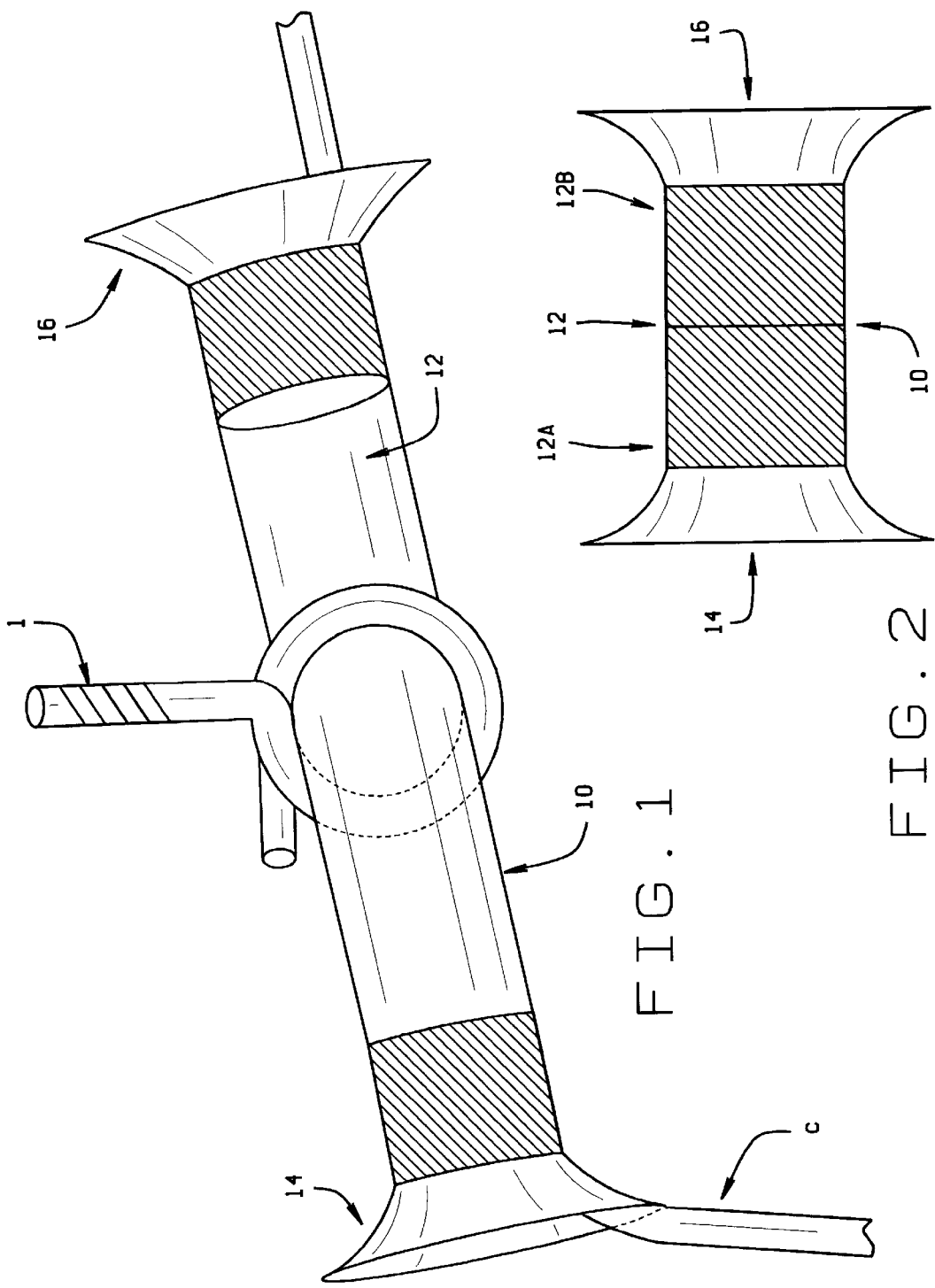

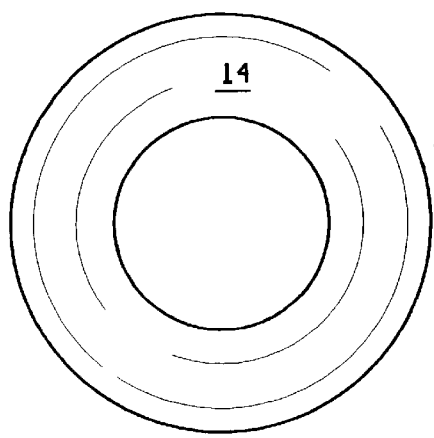
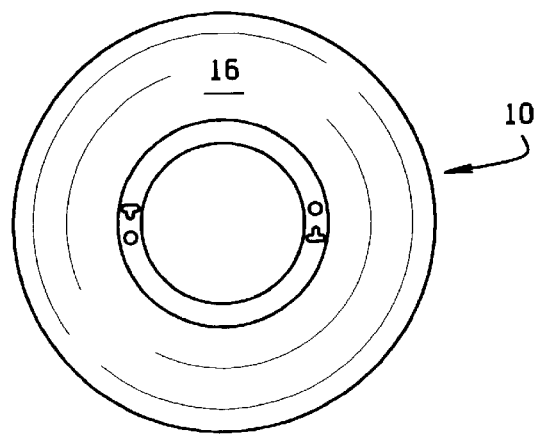
FIG. 3    FIG. 4
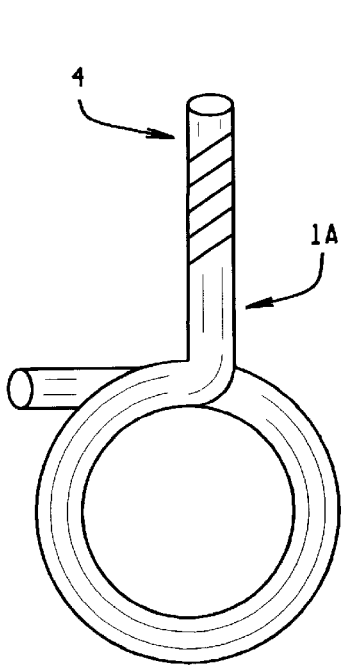
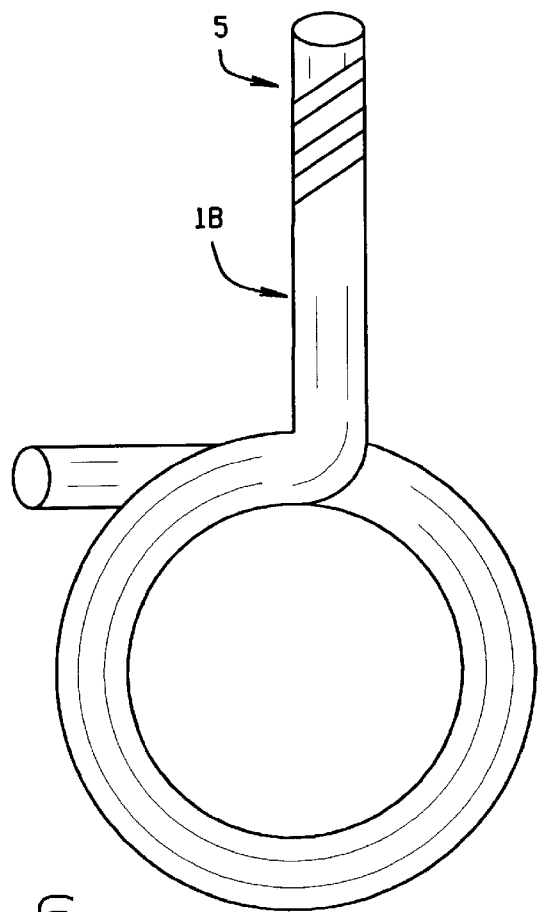
FIG. 5    FIG. 6

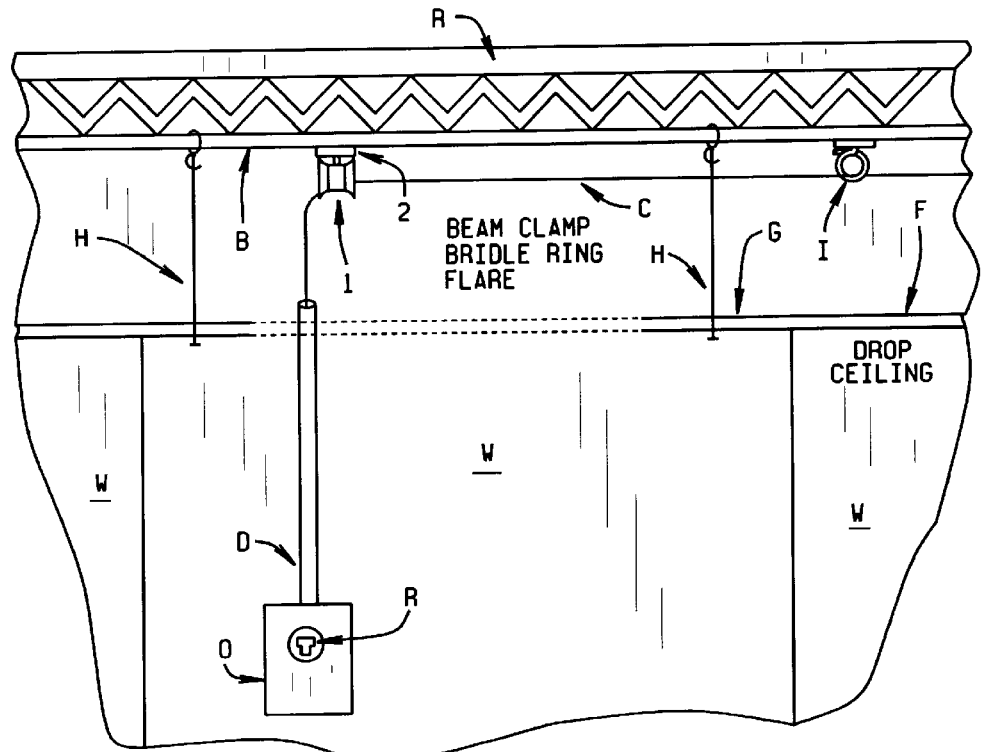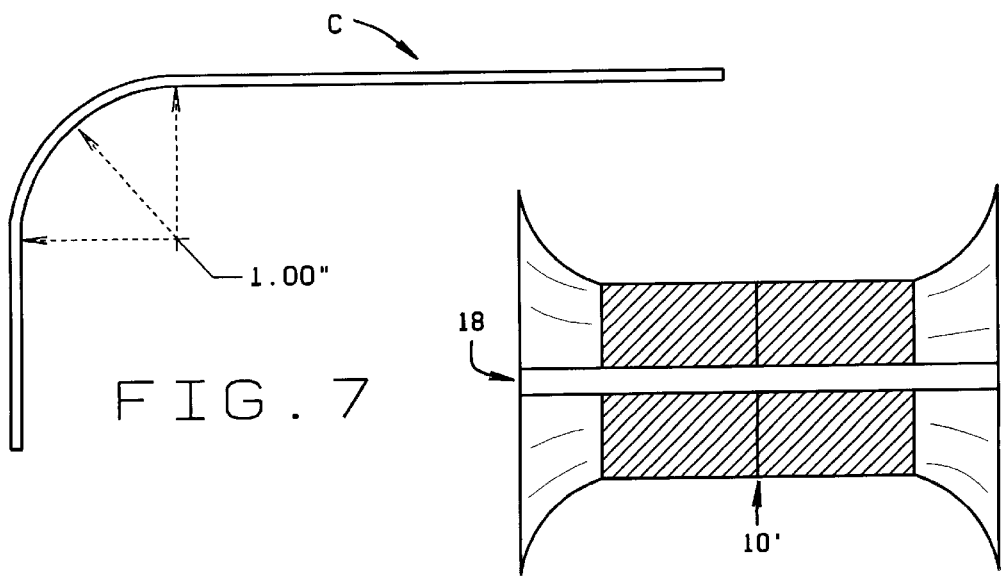

FLARED CABLE SUPPORT FOR TELECOMMUNICATION SYSTEM INSTALLATIONS

CROSS-REFERENCE TO RELATED APPLICATIONS

This application is a continuation-in-part of U.S. patent application Ser. No. 08/591,737 filed Jan. 26, 1996.

STATEMENT REGARDING FEDERALLY SPONSORED RESEARCH OR DEVELOPMENT

Not applicable.

BACKGROUND OF THE INVENTION

This invention relates to telecommunications systems and their installation, and more particularly, to a flared cable support used for installing cables capable of high speed data rate transmissions used in such systems.

Telecommunication systems used in commercial or residential buildings typically involve a number of user sites between which various types of information is transferred. Cables are used to interconnect the user sites. A computer or other piece of telecommunications equipment is connected to an outlet which is a wall mounted outlet adjacent a work area. Cables are strung inside the walls and above the ceilings of the building to interconnect or cross-connect the outlets to each other. Thus, a routing from one outlet to another includes vertical cable sections extending inside a wall, and horizontal cable sections extending above the ceiling of the room or rooms in which the communications equipment is located. Telecommunications systems include a central control unit located in closet or room, and all of the system cabling is routed to and from this central unit.

Horizontal cabling is that portion of the cabling system extending from the work area outlets or connectors to a horizontal cross-connect located in closet or room where the central control unit is placed. The cabling systems employed operate over various transmission media. Three types of cables are currently recognized for use in cabling systems. These include 100 ohm 24 gauge unshielded twisted pair cable (UTP)

150 ohm 24 gauge shielded twisted pair cable (STP)

fiber optic multimode 62.5/125 micron cable.

It is well-recognized that data can be transferred to, from, and within a telecommunications system at different transfer rates. With respect to UTP cable, for example, there are different categories of cable for different transmission rates. Category 3 is for transmission rates on the order of 16 mhz, Category 4 is for transmission rates on the order of 20 MHz, and Category 5 is for rates of 100 mhz. For higher rate data communications (100 MHz or higher) it is very important that the telecommunications media be properly installed in the building. Cable installation practices in this regard are set forth in the ANSI/TIA/EIA-568-A Building Telecommunications Wiring Standards.

One element addressed in these standards relate to the bend radius of a cable when, for example, its routing changes from vertical to horizontal or vice versa. In this regard, paragraph 10.6.3.2 of the standard reads as follows:

"in spaces with UTP terminations, cable bend radii shall not be less than four-times the cable diameter for horizontal cable."

The UTP cable referred to in the standard consists of 24 AWG thermoplastic, insulated, solid conductors formed into four individually twisted pairs and enclosed in a thermoplastic jacket. The diameter of such a cable is 0.25" (6.35 mm). It has been found, that if these bend radii are not met, the cable will have a kink or crimp in it. This adversely effects transmission so that the desired data transmission rate cannot be achieved. This, in turn, seriously comprises operation of the system. It is important therefore to provide a horizontal cable installation in which specified bend radii are easily met during cable installation, as well as subsequently thereto when work on or around cables may take place.

In addition to the need to insure proper installation of cables during new system construction, it would also be advantageous if retrofitting of cables in previous constructions could also be accomplished. It has been known for some time to use a wall mounted clip or hanger from which the cable is supported. For horizontal runs of cable, and for corner turns, it is particularly important that the cable not droop and that the bend radius of the cable exceed the minimum bend radius previously referred to. Otherwise, too much droop or too tight a bend effects the optical characteristics of a fiber optic cable, degrading data transmission quality, and introducing cross-talk, among other problems. Some hangers now used for new installations provide a flared support by which cable turns cannot be less than the desired minimum radius so to alleviate the problems outlined above. One hanger of this type is referred to as a J-shape hanger. Such hangers have a curved surface at a lower, curved end of the J, this curved portion of the hanger flaring outwardly to the sides of the hanger. Once a cable is fitted in the hanger, a separate tie is used to close the top of the J and secure the cable in place. However, for retrofitting of prior installations, such hangers cannot be used because their design is such that in order for them to be used, the cable must be removed from its prior fitting and the new hanger substituted. This is a time consuming and expensive operation.

BRIEF SUMMARY OF THE INVENTION

Among the several objects of the present invention may be noted the provision of a cable support for use in the installation of data transmission cables for a telecommunications system;

the provision of such a cable support to facilitate routing cables through a structure and, in particular, around bends in the structure;

the provision of such a cable support to have flared ends the radius of each of which corresponds to the bend radius for a cable specified in the ANSI/TIA/EIA-568-A Building Telecommunications Wiring Standards;

the provision of such a cable support to be equally useful with whatever type and category of approved cable is used in a telecommunications system;

the provision of such a cable support to be readily installed in place using bridle rings or the like which mount the cable support in a desired location, or to be retrofitted into previous installations where existing cable supports are not adequate to prevent droop or allow an adequate bend radius at turns;

the provision of such a cable support which is installed with existing supports and allows a cable to be quickly and easily fitted into the new support;

the provision of such a cable support to be of a two-piece construction in which the pieces are identically formed, readily connected together on site and can be used interchangeably regardless of the location used, that is, for a vertical run of cable, a horizontal run, or a corner;

the provision of such a cable support in which a cable installer can carry pieces forming the support with him either assembled or disassembled, and if disassembled, can assemble a support by hand and with no special tools required;

the provision of such a cable support to be of a made of a material compatible with National Electrical Code requirements for the environment in which the support is installed;

the provision of such a cable support which is small enough that the supports required for a cable installation are easily stored where needed for quick access by the cable installer; and, the provision of such a cable support which is of a two-part construction using identically formed components which are readily assembled on site for the support to be low cost and available in a variety of sizes for use in all types of cable installations.

In accordance with the invention, generally stated, a cable support is used to route a telecommunications system cable by which data is transmitted from one site of the system to another. The sites are remote from one another and routing of the cable between sites includes both horizontal reaches and vertical drops of the cable. The cable support comprises an elongate hollow tube which is formed of two identical pieces which are fitted together by hand. The inner diameter of the tube is greater than the outer diameter of the cable for the cable to be fitted through the tube. Each end of the tube includes an outwardly flaring section which has a radius of curvature corresponding to a defined radius of curvature for bending the cable from a vertical-to-horizontal direction, or vice versa. Each piece forming the cable support has a helical slot extending from an outer to an inner end of the piece. When assembled, the inner ends of the slot mate together, and a slot extending throughout the length of the support is formed. This allows a length of cable to be readily inserted into the support. The inner ends of the pieces fit together by a friction fit so no special tools are required to assemble a support. The cable support is, in turn, supported by a bridle ring or the like. Use of the cable support prevents droop and insures that the bend radius of the cable meets standards set for the cable's bend radius. This prevents degration in cable performance in the transfer of information when the cable is employed in a completed installation. Other objects and features will be in part apparent and in part pointed out hereinafter.

BRIEF DESCRIPTION OF THE SEVERAL VIEWS OF THE DRAWINGS

In the drawings, FIG. 1 is an installed view of a flared cable support of the present invention supported on a bridle ring and with a data transmission cable installed on the support;

FIG. 2 is a side elevational view of the support;

FIG. 3 is a front elevational view of the support;

FIG. 4 is a rear elevational view of the support;

FIG. 5 is an elevational view of a first bridle ring used with the support;

FIG. 6 is an elevational view of a second bridle ring used therewith;

FIG. 7 is a representation of a section of data transmission cable illustration an approved bend radius for the cable;

FIG. 8 is a partial sectional view of a building in which a telecommunications system is installed and illustrating routing of a data transmission cable through the building;

FIG. 9 is a side elevational view of a second embodiment of the support for use in retrofitting cables from prior installations;

Corresponding reference characters indicate corresponding parts throughout the drawings.

DETAILED DESCRIPTION OF THE INVENTION

Figure 10:
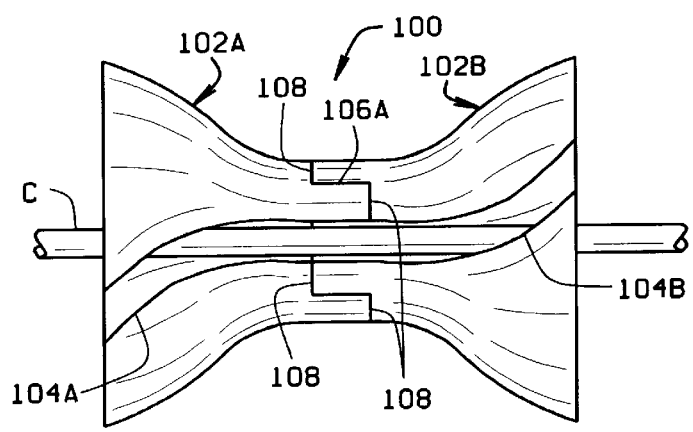
FIG. 10 is a side elevational view of a hanger of the present invention
Figure 11:
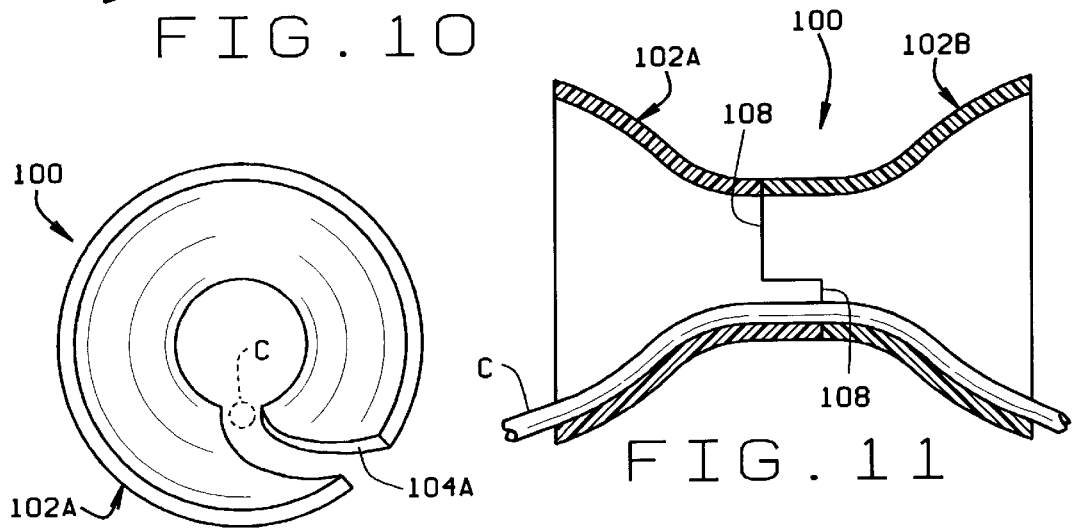
FIG. 11 is a sectional view of the hanger.
Figure 12:
FIG. 12 is an end view of the hanger.

Referring to FIG. 8, a telecommunications system includes a plurality of work stations (computer terminals, printers, etc.) which are interconnected together using a preferred cable C. The cable has a number of desired operating characteristics one of which is data transmission rate via the cable. When the communications system is installed in a building, the cable is typically routed behind or up the side of walls W, and above a ceiling such as the drop ceiling G shown in FIG. 8. A roof truss Q has a beam B from which hangers H depend. Ceiling panels P fit into a framework F supported by the hangers to form the drop ceiling. The transmission cable is routed through the space between the truss framework and the drop ceiling. Also as shown in FIG. 8, an outlet O is mounted to wall W and the various pieces of equipment comprising the system connect into it via a receptacle R in the outlet box. A vertical conduit D extends upwardly from the outlet box to a point above the drop ceiling. The conduit, for example, has a ¾" inner diameter (i.d.).

Cable C is shown in FIG. 8 to have both a horizontal run, and a vertical drop. For the horizontal run, the cable is supported, at intervals, by a bridle ring 1. Ring 1 is, in turn, carried by a clamp 2 which secures the ring to a truss beam of the roof truss. At the location where the cable drops vertically into the conduit, the cable has heretofore been supported by another bridle ring and beam clamp assembly. In order to prevent crimping or kinking the cable, which could adversely effect cable performance and operation of the system, the bridle ring/clamp assembly had to be so located that the radius of curvature of the cable met ANSI/TIA/EIA-568-A Building Telecommunications Wiring Standards for the cable. As shown in FIG. 7, for one type and category of cable, a UTP cable, the radius is 1". To assure this radius was met, the installer typically uses gauges, guides, or other tools, the use of which adds to the installation time.

As best shown in FIG. 1 a cable support of the present invention is indicated generally at 10. Support 10 comprises an elongate, hollow tube 12, the length of which can vary depending upon the type of cable being installed, and the location of bends in the cable. At each end of the support is a flared end section 14, 16 respectively. These end sections flare outwardly so as to give the support a horn shaped appearance. Importantly, however, the radius of curvature of each end section corresponds to the radius of curvature set out in the wiring standards for the particular cable with which the support is used. Thus, though not shown, it will be understood that there are a variety of models of the support for use with different cables and in different installation configurations with the particular radius of curvature being different for the different applications.

Referring to FIGS. 2–4, support 10 is shown in FIG. 2 to be formed of two mating sections 12A and 12B, the respective ends 14 and 16 being integrally formed with one of the respective sections. The overall length of support 10 is, for example, 3"; although, the support could be longer, as shown in FIG. 1, or shorter. The diameter of the support, at the outer end of the flared end sections is, for example, 2.5", and, the inner diameter of tube 12 is, for example, 1". Again, these dimensions could be greater or smaller without departing from the scope of the invention. Since the diameter of a cable used in system installations is on the order of ¼", the support is of an ample size to facilitate insertion of the cable through the support. The length of the flared ends of the support, together with their radius of curvature provide the desired cable bend radius without the need of gauges, guides, or similar tools. Also, the support is large enough that it can be readily handled by an installer, but small enough to fit into the confined spaces through which a cable is routed. It is also sufficiently small that a quantity of units can be easily carried to and about the installation site.

Referring to FIGS. 5 and 6, bridle rings 1A and 1B with which the supports are usable are shown. Each ring has a screw end, 4 and 5 respectively, for threading the ring into a beam clamp or a beam. The other end of the ring has a diameter conforming to an outer diameter of tube section 12 of the support. The inner diameter of ring 1A is, for example, 1.25", while that of ring 1B 2.5". Again, the ring diameters may differ depending upon the support 10 being used in an installation. It will be understood that with respect to the support 10 shown in FIG. 2, that the support can be assembled at the work site by inserting one section 12A or 12B through the ring portion of a bridle ring 1 and then connecting that support section with the other support section. Or, the bridle ring and support can be manufactured as an assembly and carried to the work site.

The material from which the cable support is formed is determined by the operating environment within which the cable and the cable support are placed. These materials, which meet the requirements of the National Electrical Code specification NFPA 70, include aluminum, fire retardant thermoplastics, and polyvinyl chloride. The environments where it is contemplated the supports will be used include ducts, plenums, and other spaces used for environmental air, vertical runs (risers) in a shaft, and other general areas. It will be understood that the flared cable support 10 of the present invention may be installed anywhere a data transmission cable has a bend or turn and the bend radius is controlled to prevent cable twisting, kinking or other deformation. Thus, the cable support could also be used to where a cable is routed around a corner, or is run under a floor rather than above a ceiling. The cable support can also be installed on the outside of a building as well inside of it. All of these uses of the cable support are within the scope of the invention.

As shown in FIG. 9, a support 10' is shown having a longitudinal slot 18 extending the entire length of the support. Support 10' is for use in retrofitting previous cable installations. Support 10' is first fitted about the cable by inserting a length of cable into slot 18. The support is adjusted until it and the cable are properly located relative to the bend in the cable. Once this is done, a bridle ring is fitted about the support and attached to the beam or clamp as previously described.

Figure 13:
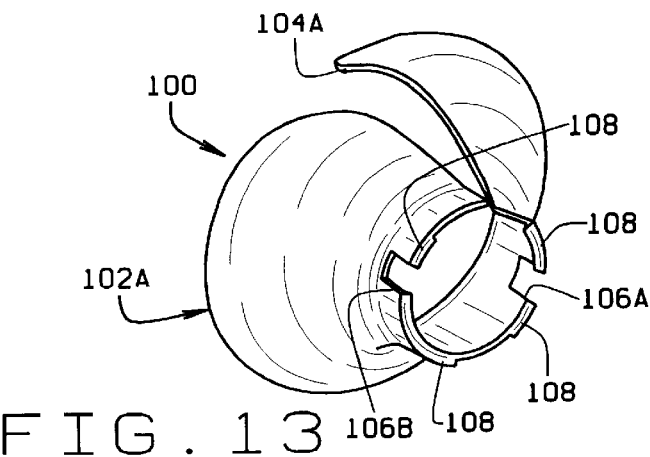
FIG. 13 is a perspective view of the hanger.
Figure 14:
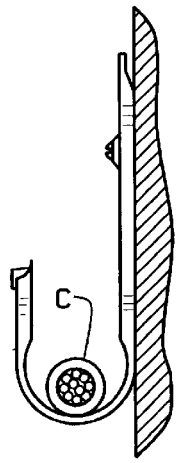
FIG. 14 illustrates a J-shape type prior art hanger.

Referring to FIGS. 10–13, a cable support or hanger 100 is shown which is expeditiously used both for new cable installations and for retrofitting of existing installations. A particular advantage of support 100 is that for retrofitting operations, the cable support is readily used without the cable having to be unstrung from the previously used supports, the old supports removed, new supports installed, and the cable restrung. Rather, because of the unique design and construction of support 100, the support is readily assembled on-site, is installed adjacent or in close proximity to existing cable supports, whether D-ring or J-shaped type supports, with the cable then being easily inserted into the support while remaining in place. A prior art J shaped device is shown in FIG. 14 and includes a separate tie which is used to close the opening by which the cable is fitted in place so to prevent subsequent dislodgement of the cable.

As shown in the drawings, cable support 100 is comprised of two identically formed pieces 102A, 102B. The design of these pieces is such that they are interchangeable. This means that rather than having to be preassembled prior to a worker installing them, the worker can simply carry a supply of pieces to the work site, and assemble a completed support for installation simply by selecting two pieces, at random, and fitting them together. Such a single piece construction further reduces manufacturing costs because only one mold is required to make the parts, and inventory costs are minimized because quantities of only one part number has to be maintained.

Support 100 pieces 102A and 102B, each form a section of tube having a first diameter at an inner end of the piece, when the pieces are assembled to form the support, and a flared outer end. As with the previously described cable supports, the overall length of a completed support 100 is normally 3", the diameter of the support, at its outer flared ends sections is 2.5", and the diameter of the support the inner end of the pieces is 1". Also as with the other described supports, these dimensions could be greater or smaller without departing from the scope of the invention. A cable channel 104A, 104B is formed in the respective pieces; and as shown in the drawings, the channels are helically shaped with each channel curving inwardly from the outer flared end of a respective piece 102A, 102B into the inner end of the piece. Each channel is of uniform width throughout its length and is sufficiently wide to accommodate the ¼" diameter of the cables with which the support is typically used. It will be understood that the cable channel width can be of any appropriate size depending upon the diameter of the cable with which the support is used again without departing from the scope of the invention. The curvature of the channel from one end of each piece to the other is identical for each piece, so the end points of the channel are the same for each piece; that is, the inner ends of each channel section are coterminous. As a result, when the pieces 102A, 102B are joined together, a continuous cable channel is formed which extends from one end of the completed cable support to the other. Because such a cable channel is provided, a cable installer can readily fit a preinstalled cable through the channel so the cable is now captured in the support, this being accomplished without having to first remove the previous support or unstring cable. As with the previously described embodiments, the length of the flared ends of the completed support, together with their radius of curvature, provide the desired bend radius for the cable. And, because the cable support sections 102A, 102B are small in size, a sufficient quantity of pieces can be easily carried to and about the installation site by an installer for ready assembly of a completed cable support as needed. After cable installation, the support is mounted to a truss or beam using a bridle ring, for example, as previously described.

At the inner end of each piece 102A, 102B, at spaced locations about the circumference of the inner end of the piece, are opposed slots 106A, 106B. These opposed slots extend inwardly into the body of the piece a predetermined distance. These slots extend parallel to each other and the portion of the end of the piece defined by adjacent slots form sections or fingers 108 of the piece. These fingers interfit with corresponding sections or fingers 108 on the other piece forming a cable support. The fingers frictionally engage with the fingers on the other piece so to form the completed cable support. As shown in FIG. 13, the inner end of the channel extending through each piece forms a cut-away portion of one of the fingers 108, so as not to effect the symmetry of the fingers. Again, because each piece 102 is identically formed with each other piece, the installer can select any two pieces, at random, from an inventory of pieces to make a cable support. And, this can be done without the use of tools and with no fasteners being required to hold the pieces together. Prior to mating pieces 102A, 102B together, the installer inserts the ring section of a bridle ring over the smaller diameter end of one of the pieces. The ring section has a diameter slightly larger than this end of the pieces so to readily be fitted over the end of the piece.

What has been described is a cable support used in installing data transmission cables for a telecommunications system. The cable support facilitates cable routing through a building, and particularly around corners or bends within the building structure. The cable support has flared ends the radius of each of which corresponds to a cable bend radius set forth in the ANSI/TIA/EIA-568-A Building Telecommunications Wiring Standards. Importantly, the cable support is usable with all types and categories of approved cable used in a telecommunications system, and can be used for both initial and retrofit installations. The cable support is installed using bridle rings or similar appropriate hangers to install the support in a desired location. Each cable support is of National Electrical Code approved materials for the environment in which the support is installed. The cable supports are small enough that a sufficient number for use in an installation are easily stored for use when needed. In a preferred embodiment, a cable support is formed by joining together to identically formed pieces each of which has a cable channel extending completely therethrough. This cable channel extends through the completed support to allow a cable to be fitted into the support during a retrofit operation without the cable having to be removed or restrung. Finally, because identical pieces are used to form the cable support, manufacturing, inventory, and assembly costs are minimized.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A cable support for routing cable used in a telecommunications system from one using site in the system to another, the using sites being remote from one another and the routing of cable between sites including both horizontal reaches and vertical drops of the cable, the cable support being mounted in a path over which the cable is routed between sites to support a length of cable, the cable support being used for both initial cable installation and retrofitting of cable installations, the cable support comprising:

a hollow tube in which a length of cable is supported on an inner surface of said tube, the tube flaring outwardly at each end to form a curved inner surface on which the length of cable is supported, said curved surface preventing the cable from either kinking or forming a cable bend sufficiently severe as to effect transmissive properties of the cable, the tube comprising two substantially identically formed pieces which interfit together to form said cable support, one end of each piece forming an outwardly flared end of said tube, and the opposite ends of said pieces being shaped so as to interfit with each other to form a completed cable support;

a slot extending the length of each said piece to provide an opening for installing the length of cable in said tube, said slot being a helically shaped channel whose width is greater than the diameter of the cable for inserting the length of cable into said tube and preventing the cable, once installed in said tube, from coming out of said cable support regardless of the orientation of said cable support when mounted in place, the slot in each piece being shaped such that when the ends of the pieces are interfitted together to complete the tube, a continuous slot is formed extending from one end of the completed tube to the other.

2. The cable support of claim 1 wherein the tube has an intermediate section of a generally uniform outer diameter and the cable support further includes a bridle ring one end of which forms an open ring into which said intermediate section of said tube fits to mount said cable support in place, said helical slot facilitating installation of said cable segment in said tube after said tube is installed in said bridle ring.

3. A method of installing cable used in a telecommunications system for transmitting information from one using site in the system to another using site therein through the cable, the using sites being remote from each other and routing cable between the sites includes both horizontal reaches and vertical drops of cable, the method comprising:

mounting a bridle ring in a desired location for supporting a length of cable;

forming two substantially identical cable support pieces each of which has a flared end and a end shaped to interfit with a corresponding end of the other piece, said interfitting ends of said cable support pieces having an outer diameter which is less than an inner diameter of a ring end of said bridle ring for said interfitting end to be inserted through said ring end;

forming a cable support from said cable support pieces by interfitting said cable support pieces together, the ring end of said bridle ring fitting around said completed cable support, said cable support comprising a hollow tube having an inner surface on which cable is supported when installed in said tube, said tube flaring outwardly at each end to form a curved surface on which a cable segment is supported to prevent the cable from either kinking or forming a cable bend sufficiently severe as to effect transmissive properties of the cable, said cable support having a slot extending the length of the tube when said pieces are assembled, said slot having a slot width greater than a cable's diameter to provide an opening for installing the length of cable in said tube; and, inserting a length of cable first through an opening in the bridle ring and then into said slot for the length of cable to be supported in said tube on said inner surface thereof, said slot being a helically shaped channel which prevents cable, once installed in said cable support, from coming out of said cable support regardless of the orientation of said cable support when mounted in place.

* * * * *